3,007,957
REDUCTION OF NITROARYLHYDROCARBON-
OXYSILANES IN THE PRESENCE OF ABSORB-
ENTS
Donald L. Bailey, Snyder, Enrico J. Pepe, Kenmore, and Bernard Kanner, Tonawanda, N.Y., assignors to Union Carbide Corporation, a corporation of New York
No Drawing. Filed Sept. 18, 1959, Ser. No. 840,791
7 Claims. (Cl. 260—448.8)

This invention relates to a process for producing organosilicon compounds.

This invention provides a process for producing aminoarylhydrocarbonoxysilanes which involves reducing a nitroarylhydrocarbonoxysilane with hydrogen in the presence of a catalytic amount of a hydrogenation catalyst and an absorbent for water that is not reactive with aminoarylhydrocarbonoxysilanes and at a hydrogen pressure of at least 20 pounds per square inch gauge and a temperature of at least 20° C. under anhydrous conditions. The reduction is preferably conducted with an anhydrous aromatic hydrocarbon or an alcohol serving as a solvent for the nitroarylhydrocarbonoxysilane.

The starting nitroarylhydrocarbonoxysilanes that are reduced according to the process of this invention can be represented by the formula:

$$O_2N Ar Si(OR)_{3-a} \quad (1)$$

wherein Ar is a phenylene, an alkyl-substituted phenylene (e.g. a methyl-, ethyl-, propyl- or butyl-substituted phenylene group) or an alkoxy-substituted phenylene group (e.g. a methoxy-, ethoxy, propoxy- or butoxy-substituted phenylene group), R is a monovalent hydrocarbon group free of aliphatic unsaturation (e.g. an alkyl group such as a methyl, ethyl or propyl group, an aryl group such as a phenyl group, an alkaryl group such as a tolyl group or an aralkyl group such as a beta-phenylethyl group) and $a$ has a value from 0 to 2. In Formula 1 R can represent the same or different groups, Ar is preferably a phenylene group, OR is preferably an ethoxy group and $R_a$ is preferably $(CH_3)_a$.

Illustrative of the nitroarylhydrocarbonoxysilanes represented by Formula 1 are: ortho-, meta- and para-nitrophenyltriethoxysilane, ortho-, meta- and para-nitrophenylmethyldiethoxysilane, ortho-, meta- and para-nitrophenyldimethylethoxysilane, the nitrotolylphenyldiphenoxysilanes and the nitrotolylphenylmethylpropoxysilanes.

The absorbents for water that are useful in this invention include calcium sulfate, silica gel, alumina, magnesium sulfate and sodium sulfate. The preferred absorbents are crystalline zeolitic molecular sieves. These absorbents do not react with the aminoarylhydrocarbonoxysilanes produced in this invention. Lower yields of the desired aminoarylhydrocarbonoxysilanes are obtained in the absence of such absorbents.

The zeolitic molecular sieves that are useful as absorbents in this invention are metal-alumino-silicates that are crystalline in structure. The crystalline structure of these zeolitic molecular sieves is such that the crystals contain interstitial spaces or cavities, access to which is had by way of openings or pores in the surface of the crystal. Foreign molecules (e.g. water molecules) whose size permits them to pass through the pores and into the cavities of the zeolitic molecular sieve are strongly retained by a sorption phenomenon within the cavity. The retention of foreign molecules (adsorbates) by zeolitic molecular sieves is also determined by such factors as the polarizability and polarity of the adsorbate, the degree of unsaturation of the adsorbate, the size and polarizing power of the metal in the zeolitic molecular sieve, the presence of other adsorbates in the cavities of the sieve and the degree of dehydration of the sieve. Suitable crystalline zeolitic molecular sieves are those whose pores are large enough to admit water molecules but too small to admit the starting nitroarylhydrocarbonoxysilane molecules or the desired aminoarylhydrocarbonoxysilane molecules.

Both natural and synthetic crystalline zeolitic molecular sieves are suitable for use as absorbents in this invention. Suitable zeolites include chabazite, mordenite, Zeolite D (which is disclosed, along with a process for its preparation, in U.S. patent application Serial No. 680,383, filed August 26, 1957), Zeolite B (which is disclosed, along with a process for its preparation, in U.S. patent application Serial No. 827,680, filed July 17, 1959) and Zeolite A (which is disclosed, along with a process for its preparation, in United States Patent 2,882,243). The sodium and calcium forms of Zeolite A are particularly useful.

The zeolitic molecular sieves that are used in this invention are activated prior to use by heating the sieve. Apparently, heating the sieves effects a release of water molecules that are contained in the cavities of the sieve. The heating and the resulting loss of water does not destroy the crystalline structure of the sieve. The activation may be conducted, in the usual case, by heating the sieve at a temperature from about 250° C. to about 600° C.

The amount of the absorbent for water employed in this invention is that amount which is sufficient to absorb the water formed in the reduction of the starting nitroarylhydrocarbonoxysilane, which reduction can be represented by the equation:

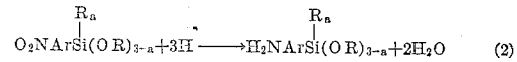
$$O_2N Ar Si(OR)_{3-a} + 3H_2 \longrightarrow H_2N Ar Si(OR)_{3-a} + 2H_2O \quad (2)$$

wherein Ar, R and $a$ have the above-defined meanings. The amount of absorbent employed will therefor depend upon the water-absorbing capacity of the particular absorbent used. Amounts of absorbent from 50 to 1000 parts by weight of the starting silane are generally useful but amounts of the absorbent from 100 to 400 parts by weight per 100 parts by weight of the starting silane are preferred.

Absorbents for water that react with the desired aminoarylhydrocarbonoxysilanes produced in this invention (e.g. such absorbents as calcium chloride, phosphorous pentoxide, acid anhydrides) are not useful in this invention.

Preferably, the process of this invention is conducted within an anhydrous solvent. Aromatic hydrocarbons such as benzene, toluene and xylene are suitable solvents. Particularly good results (e.g. high yields of the desired aminoarylhydrocarbonoxysilanes) are obtained when alcohols are employed as a solvent for the starting nitroarylhydrocarbonoxysilanes. To avoid transesterification reactions the alcohol used should correspond to the hydrocarbonoxy group present in the starting silane (e.g. ethanol should be used when the starting silane is an ethoxysilane). Suitable alcohols are compounds represented by the formula

$$ROH \quad (3)$$

wherein R has the above-defined meaning. Such alcohols include methanol, ethanol, propanol, phenol and the like.

Amounts of solvent from 10 parts to 1000 parts by weight per 100 parts by weight of the starting nitroarylhydrocarbonoxysilane are generally useful but amounts of the solvent from 100 to 500 parts by weight per 100 parts by weight of the starting silane are preferred.

The above-indicated amounts of absorbent and solvent are not critical and so other amounts can be employed. However, no commensurate advantage is gained thereby.

Suitable hydrogenation catalysts for use in this invention are platinum catalysts (e.g. platinum oxide), palladium on carbon, Reney-nickel and the like. A catalytic amount, usually from about 0.01 to about 5 parts by weight of catalyst per 100 parts by weight of the starting silane, is added. The pressure and temperature are not critical. However, the reduction is best carried out at a hydrogen pressure of at least about 20 pounds per square inch gauge (p.s.i.g.), and at a temperature of at least about 20° C. Higher temperatures can be used, but the temperature should preferably be below the boiling point of the solvent selected. After the reduction is completed, the reaction mixture is filtered to remove the insoluble catalyst and the desired aminoarylhydrocarbonoxysilane is recovered by conventional distillation techniques.

The aminoarylhydrocarbonoxysilanes produced in accordance with the process of this invention can be represented by the formula:

$$H_2NArSi(OR)_{3-a} \qquad (4)$$

wherein Ar, R and $a$ have the above-defined meanings. Illustrative of these silanes are ortho-, meta- and para-aminophenyltriethoxysilane, ortho-, meta- and para-aminophenylmethyldiethoxysilane, ortho-, meta- and para-aminophenyldimethylethoxysilane, the aminotolylphenyldiphenoxysilanes and the aminotolylphenylmethylpropoxysilanes.

Mixtures of nitroarylhydrocarbonoxysilanes can be converted to mixtures of the corresponding aminoarylhydrocarbonoxysilanes according to the process of this invention.

It is essential that anhydrous conditions are maintained during the process of this invention. Even small amounts of water decrease the yield of the desired aminoarylhydrocarbonoxysilanes.

The aminoarylhydrocarbonoxysilanes produced in accordance with the process of this inveniton are useful in a variety of applications. By way of illustration, the aminoaryltrihydrocarbonoxysilanes can be hydrolyzed and condensed by convention procedures to produce resins that are useful as protective coatings for metals. As a further illustration, the aminoarylhydrocarbondihydrocarbonoxysilanes can be hydrolyzed and condensed by known procedures to produce oils that are useful as lubricants. As another illustration, the aminoaryldihydrocarbonhydrocarbonoxysilanes can be hydrolyzed and condensed by known procedures to produce disiloxanes that can be equilibrated with conventional siloxanes to incorporate end-blocking groups therein.

The following examples illustrate the present invention.

*Example I*

To a 300 milliliter stainless steel pressure vessel were added 128.5 grams (0.503 mole) of a mixture of ortho-, meta- and para-nitrophenylmethyldiethoxysilane $$[O_2NC_6H_4SiMe(OC_2H_5)_2]$$

75 milliliters of absolute ethanol, 20 grams of the sodium form of Zeolite A and 0.75 gram of platinum oxide. The vessel was purged with nitrogen and hydrogen and then hydrogen was added to the vessel at room temperature until the pressure therein was 500 p.s.i.g. over a period of two hours. The temperature rose spontaneously to 50° C. and the pressure in the vessel tended to decrease but was maintained at 500 p.s.i.g. by repeatedly adding hydrogen. The contents of the vessel were filtered to remove the platinum oxide and then stripped of the solvent. The residual liquid so produced was distilled to produce a 38% yield of a mixture of ortho-, meta- and para-aminophenylmethyldiethoxysilane $$[H_2NC_6H_4SiMe(OC_2H_5)_2]$$

which boiled at 115 to 117° C. at 1.0 mm. of Hg and a refractive index ($n_D^{25}$) of 1.5119.

*Example II*

To a 300 milliliter stainless steel pressure vessel were added 64 grams (0.25 mole) of a mixture of ortho-, meta- and para-nitrophenylmethyldiethoxysilane, 100 milliliters of anhydrous benzene and 0.5 gram of platinum oxide. The vessel was sealed, purged with argon and hydrogen and hydrogen was added at room temperature until the pressure in the vessel reached 500 p.s.i.g. Over a period of one hour the temperature in the vessel rose to 48° C. and hydrogen was added to the vessel at intervals with rocking to maintain the pressure at 500 p.s.i.g. The contents of the vessel were then filtered and the filtrate stripped of benzene. The residue so produced was distilled at reduced pressure to separate a mixture of ortho-, meta- and para-aminophenylmethyldiethoxysilane in a 2.5% yield having a refractive index ($n_D^{25}$) of 1.5100.

A comparison of the yields obtained in Example I (where an absorbent was used) and Example II (where no absorbent was used) demonstrates that superior yields are obtained when absorbents are used in the reduction of nitroarylhydrocarbonoxysilanes according to the practice of this invention.

*Example III*

To a three liter rocking autoclave were added 300 grams (1.05 moles) of a mixture of ortho-, meta- and para-nitrophenyltriethoxysilane, 1800 milliliters of absolute ethanol, 300 grams of the sodium form of Zeolite A and 3 grams of platinum oxide. The autoclave was purged with nitrogen and hydrogen and hydrogen was added at room temperature until the pressure in the autoclave rose to 500 p.s.i.g. The vessel was rocked for 30 minutes and hydrogen was added at intervals to maintain the pressure in the autoclave at 500 p.s.i.g. The contents of the autoclave were then filtered and the filtrate was stripped of ethanol at reduced pressure. The residue so produced was distilled to isolate a mixture of ortho-, meta- and para-aminophenyltriethoxysilane (85% yield) which had a refractive index ($n_D^{25}$) of 1.4964 and a boiling point of 130° C. at 0.3 mm. of Hg.

The process of this invention is conducted in a closed pressure vessel (e.g. in an autoclave).

As used herein the term "absorbent for water" includes all compounds which can remove water from the reaction mixtures by sorption mechanisms including those that remove the water by an "absorption" mechanism (i.e. penetration of the water into the compounds) or an "adsortion mechanism (i.e. adhesion of the water to the surface of the compounds). Hence the term "absorbent" is used herein as including the term "adsorbent."

What is claimed is:

1. A process for producing aminoarylhydrocarbonoxysilanes represented by the formula:

$$H_2NArSi(OR)_{3-a}$$

wherein Ar is a member selected from the group consisting of the phenylene, alkyl-substituted phenylene and the alkoxy-substituted phenylene groups, R is a monovalent hydrocarbon group free of olefinic unsaturation and $a$ has a value from 0 to 2, which process comprises reducing a nitroarylhydrocarbonoxysilane represented by the formula:

$$O_2NArSi(OR)_{3-a}$$

wherein Ar, R, and $a$ have the above-defined meaning with hydrogen in the presence of a catalytic amount of a hydrogenation catalyst and an absorbent for water that is not reactive with aminoarylhydrocarbonoxysilanes and at a hydrogen pressure of at least 20 pounds per square inch gauge and a temperature of at least 20° C.

under anhydrous conditions to produce an aminoarylhydrocarbonoxysilane.

2. The process of claim 1 wherein the reduction is performed within an anhydrous solvent selected from the group consisting of aromatic hydrocarbons and alcohols.

3. The process of claim 1 wherein the absorbent is a crystalline zeolitic molecular sieve.

4. A process for producing aminophenylethoxysilanes represented by the formula:

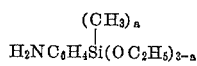

wherein $a$ has a value from 0 to 2, which process comprises reducing a nitrophenylethyoxysilane represented by the formula:

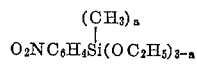

wherein $a$ has the above-defined meaning, with hydrogen in the presence of anhydrous ethanol, a catalytic amount of a platinum catalyst and Zeolite A at a gauge pressure of at least 20 pounds per square inch and a temperature of at least 20° C. under anhydrous conditions to produce an aminophenylethoxysilane.

5. A process for producing an aminophenyltriethoxysilane which comprises reducing a nitrophenyltriethoxysilane with hydrogen in the presence of a catalytic amount of a platinum catalyst, anhydrous ethanol and the sodium form of Zeolite A and at a gauge pressure of at least 20 pounds per square inch and at a temperature of at least 20° C. under anhydrous conditions.

6. A process for producing an aminophenylmethyldiethoxysilane which comprises reducing a nitrophenylmethyldiethoxysilane with hydrogen in the presence of a hydrogen in the presence of a catalytic amount of a platinum catalyst, anhydrous ethanol and the sodium form of Zeolite A and at a gauge pressure of at least 20 pounds per square inch and at a temperature of at least 20° C. under anhydrous conditions.

7. A process for producing an aminophenyldimethylethoxysilane which comprises reducing a nitrophenyldimethylethoxysilane with hydrogen in the presence of a catalytic amount of a platinum catalyst, anhydrous ethanol and the sodium form of Zeolite A and at a gauge pressure of at least 20 pounds per square inch and at a temperature of at least 20° C. under anhydrous conditions.

References Cited in the file of this patent

UNITED STATES PATENTS 2,867,628     Cass _ _ _ _ _ _ _ _ _ _ _ _ _ _ _ _ _ Jan. 6, 1959

OTHER REFERENCES

Kipping et al.: Jour. Chem. Soc. (London), vol. 138 (1935), pp. 1085–8.

Benkeser et al.: Jour. Am. Chem. Soc., vol. 74 (1952), pp. 253–4.